United States Patent
Erban (10) Patent No.: US 9,687,795 B2
(45) Date of Patent: Jun. 27, 2017

(54) FOAMING DEVICE

(71) Applicant: HENKEL AG & CO. KGAA, Duesseldorf (DE)

(72) Inventor: Jens Erban, Kleve (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 273 days.

(21) Appl. No.: 14/406,423

(22) PCT Filed: May 29, 2013

(86) PCT No.: PCT/EP2013/061094
§ 371 (c)(1),
(2) Date: May 26, 2015

(87) PCT Pub. No.: WO2013/182467
PCT Pub. Date: Dec. 12, 2013

(65) Prior Publication Data
US 2015/0306552 A1    Oct. 29, 2015

(30) Foreign Application Priority Data

Jun. 6, 2012    (DE) .......................... 10 2012 209 517

(51) Int. Cl.
*B01F 3/04*    (2006.01)
*B01F 15/00*    (2006.01)
(Continued)

(52) U.S. Cl.
CPC ...... *B01F 3/04446* (2013.01); *B01F 3/04453* (2013.01); *B01F 3/04992* (2013.01);
(Continued)

(58) Field of Classification Search
CPC  B01F 3/04446; B01F 5/0077; B01F 15/0429; B01F 3/04992
(Continued)

(56) References Cited

U.S. PATENT DOCUMENTS 7,484,881 B2 *  2/2009  Schulz-Hanke ...... B01F 1/0027
                                                    366/339
7,717,059 B2 *  5/2010  Wanthal ................ B05B 7/0025
                                                    118/323
(Continued)

FOREIGN PATENT DOCUMENTS

DE    2628785 A1   12/1977
DE    19905229 A1   8/2000
(Continued)

*Primary Examiner* — Robert A Hopkins
(74) *Attorney, Agent, or Firm* — Sun Hee Lehmann (57) ABSTRACT

The invention relates to a foaming device (1) which has a foaming unit (2) with a foaming chamber (17), said foaming chamber comprising mechanical foaming means (15, 19) which are contained inside the chamber and by means of which at least three components that are fed to the foaming chamber (17) can be mixed. At least one adhesive, a gaseous foaming medium, and a free flowing diluent are used as the components in order to produce an adhesive foam. Adjusting means (25) are provided in order to adjust the ratio of the individual components to one another in order to influence the properties of the adhesive foam.

17 Claims, 2 Drawing Sheets

(51) Int. Cl.
- *B01F 15/04* (2006.01)
- *B29B 7/74* (2006.01)
- *G05D 11/13* (2006.01)
- *B01F 5/00* (2006.01)
- *C09J 5/08* (2006.01)
- *G05D 11/02* (2006.01)

(52) U.S. Cl.
CPC ...... *B01F 5/0077* (2013.01); *B01F 15/00149* (2013.01); *B01F 15/0429* (2013.01); *B29B 7/7414* (2013.01); *C09J 5/08* (2013.01); *G05D 11/02* (2013.01); *G05D 11/132* (2013.01); *B01F 2215/006* (2013.01)

(58) Field of Classification Search
USPC .................................................. 261/38, 72.1
See application file for complete search history.

(56) References Cited

U.S. PATENT DOCUMENTS

| | | |
|---|---|---|
| 2008/0105317 A1 | 5/2008 | Litecky et al. |
| 2009/0236025 A1 | 9/2009 | Burkus et al. |

FOREIGN PATENT DOCUMENTS

| | | |
|---|---|---|
| EP | 0204315 A2 | 12/1986 |
| EP | 0723816 A2 | 7/1996 |
| GB | 306550 A | 1/1930 |
| WO | 9524450 A1 | 9/1995 |
| WO | 0226459 A1 | 4/2002 |
| WO | 2007057059 A1 | 5/2007 |
| WO | 2009024402 A1 | 2/2009 |

* cited by examiner

FOAMING DEVICE

The present invention relates to an apparatus for foaming compounds, in particular adhesives. Such apparatuses have long been known in the existing art and are used, for example, to foam hot melt adhesive in the packaging industry.

DE 19905229 A1, for example, describes an apparatus for foaming a liquid adhesive, having a foaming unit, embodied as a dynamic mixing head, into which compressed air is injected via a conduit system.

The apparatuses of the existing art are generally intended for a specific adhesive. An adhesive that is used exhibits, as a rule, a certain characteristic tailored to a specific intended use or to a substrate having specific parameters. If a different adhesive characteristic is required, the adhesive stored in the apparatus must also be replaced; this can signify additional complexity.

The object of the present invention is therefore to provide an improved foaming apparatus.

This object is achieved by the features of the main claim.

Advantageous refinements of the invention are present in the dependent claims.

The fundamental idea of the invention is to use a foaming apparatus comprising a foaming unit having a foaming chamber having mechanical foaming means with which at least three components delivered to the foaming chambers are mixable, wherein at least an adhesive, a gaseous foaming medium, and a flowable diluent are utilized as components in order to output an adhesive foam, wherein adjusting means are provided for adjusting the ratio of the individual components with respect to one another in order to influence the properties of the adhesive foam.

Foaming units that are utilized are known in the existing art. An example of a foaming unit used is one in which an external hollow-cylindrical sleeve open at one end locally encloses a cavity (the foaming chamber), wherein pins protruding radially inwardly from the inner wall of the sleeve, which form a stator, are provided. In addition, a rotatable cylinder projects through the opening at one end of the sleeve into the foaming chamber, wherein radially outwardly protruding pins that form a rotor are provided on the enveloping surface of the cylinder. The stator and rotor constitute the foaming means. The rotor and stator are configured and mutually situated in such a way that rows of pins of the rotor which extend circumferentially along the enveloping surface are arranged between rows of pins of the stator which extend circumferentially along the inner wall of the sleeve.

The foaming unit, for example in the configuration described above, is capable, with the aid of the mechanical foaming means, of foaming the adhesive delivered to the foaming chamber and the gaseous foaming medium delivered to the foaming chamber to yield an adhesive foam. It is of course also conceivable to mix the adhesive and gaseous foaming medium before delivery into the foaming chamber.

The present invention also provides for delivery of a further component, namely a flowable diluent, into the foaming chamber. This serves preferably to influence the properties of the adhesive foam. Separate delivery into the foaming chamber is also conceivable here, but in fact also a mixing of adhesive and/or gaseous foaming medium with the flowable diluent before delivery into the foaming chamber.

The invention also provides for the use of adjusting means in order to adjust the ratios of the individual components with respect to one another in order to influence the properties of the adhesive foam. The quantity of flowable diluent delivered to the foaming chamber is preferably to be adjusted via an aforesaid adjusting means.

Addition of the flowable diluent into the foaming chamber allows the characteristics of the adhesive used to be adapted to the characteristics actually required for bonding. For example, the initial tack, open time, or other properties of the adhesive can be influenced by using a larger quantity of flowable diluent. The foaming apparatus can thus be equipped and operated, for example, with a high-quality adhesive that, for adhesive bonds having lower adhesion requirements, can be diluted by means of the flowable diluent to the extent that on the one hand sufficient bonding is enabled, and on the other hand adhesive use can be reduced thanks to the dilution. Replacement of the adhesive being used can thus be circumvented thanks to the flowable diluent.

Similarly, it is alternatively or additionally conceivable to use as a diluent an additive or additional agent for the adhesive which does not lower the properties but instead positively influences them and causes the adhesive to become of higher quality. It is accordingly also possible to use a preferably more economical basic adhesive that, for specific applications in which particular requirements are placed on an adhesive bond, can be positively influenced in terms of the required properties by means of one or more additives or additional agents in the form of said diluents.

In an advantageous embodiment, the foaming chamber comprises one or more loading openings, wherein a first delivery unit for the adhesive and a second delivery unit for the gaseous foaming medium and a third delivery unit for the flowable diluent are provided, and wherein each of the delivery units delivers the respective component to the foaming chamber via at least one of the loading openings.

Each delivery unit can contain a subassembly and can be made up of different components suitable for the intended use. For example, the first delivery unit for the adhesive can in particular comprise an adhesive tank or an adhesive connector for an external tank. Heating devices can furthermore be provided, for example in order to melt a hot melt adhesive. Tubing lines or delivery conduits for transporting the adhesive can also be provided, and can furthermore be equipped with a heating system. The use of pumps, pulsation dampers, measurement and regulation devices such as thermometers, flow meters, pressure sensors, control valves, membrane valves, check valves, or similar auxiliaries known to one skilled in the art in particular from fluid technology, is also conceivable.

The second and/or the third delivery unit respectively for the gaseous foaming agent and the flowable diluent can likewise comprise in particular a reservoir tank or reservoir container or a connector for a reservoir or a connection capability for an external source or an external tank. Here as well, heating or even cooling devices can be provided in order to preheat or cool the foaming agent and/or the diluent. Tubing lines or delivery conduits for transporting said components can also be provided, and can furthermore be equipped with a heating or cooling system. The use of pumps, pulsation dampers, water separators and/or oil separators, measurement and regulation devices such as thermometers, flow meters, pressure sensors, control valves, membrane valves, check valves, or similar auxiliaries known to one skilled in the art in particular from fluidics, is also conceivable.

The foaming unit can have a separate loading opening for each delivery unit. It is nevertheless also possible to deliver a plurality of components into the foaming chamber via one loading opening.

In an advantageous refinement, the foaming unit comprises one loading opening by means of which all components of all delivery units are delivered to the foaming chamber.

In an advantageous refinement, one delivery conduit which terminates in the loading opening is provided, wherein each delivery unit is connected to the delivery conduit and terminates via that delivery conduit in the foaming chamber.

It has thus proven to be particularly advantageous to use a delivery conduit that terminates in the loading opening, wherein all three of the components recited above terminate in the delivery conduit in different regions thereof. The delivery conduit is preferably of tubular configuration, the terminating openings of the components being arranged so as to enable mixing of the components, for example along the lines of at least partly turbulent mixing. For example, the delivery conduit can comprise a branching region or distributor segment, the branches being arranged in such a way that one of the components, but preferably several, in particular each of the components is delivered at an angle preferably greater than 30 degrees in terms of the main flow direction of the delivery conduit and/or in terms of a further component.

It has proven to be advantageous in this context if the second and/or the third delivery unit is connected to the delivery conduit via a non-return fitting, in particular a check valve or a non-return gate. The use of a spring-loaded check valve has proven advantageous here.

In an advantageous refinement, the delivery conduit itself comprises a non-return fitting, in particular a check valve or other non-return fittings recited above, between two adjacent terminating openings of two delivery units. This can be advantageous in particular in order to prevent contamination of regions or constituents of a delivery unit by the component of an adjacent delivery unit.

A further advantage is utilization of a measuring unit in order to sense the volume of adhesive delivered, and of an adjusting means in order to adjust the volume of diluent to be delivered, wherein a control and regulation unit regulates, by means of the delivered volume of adhesive which is sensed, the volume of diluent to be delivered.

Said measuring apparatus can be part of the above-described delivery unit. A flow meter can preferably be used as a measuring apparatus. Said meter can ideally be made up of a flow sensor and a measurement transducer. The use of a magnetically inductive flow meter, an ultrasonic flow meter, or a float-type flow meter is preferably conceivable here. Also conceivable here, however, is the use of other suitable flow meters that are known to one skilled in the art.

The adjusting means can be embodied in the form of a valve. The valve used is preferably one that not only switches discretely, but permits a continuous transition between switching positions, thereby enabling adjustability of the volumetric flow of diluent. A continuous valve, in particular a regulating distributing valve, a proportional valve, or a servo valve, is preferably used.

The control and regulation device can be an (in particular electronic) control and regulation device that is usually used, which can comprise a comparison unit that compares the magnitude of the value sensed by the measuring apparatus with a second one, for example in a memory of the control and regulation device, and that delivers the result of the comparison to a control unit, likewise contained in the control and regulation device, that thereupon varies by a specific amount an adjusting signal delivered to the adjusting means. A further measuring apparatus for the diluent is preferably provided, said apparatus likewise being in communication with the control and regulation device. The sensing of further process parameters by the control and regulation device is also conceivable, as is targeted control and regulation of the adhesive quantity, of the quantity of gaseous foaming medium, and of the quantity of diluent, in order to vary the properties and characteristics of the adhesive foam.

In an advantageous refinement, measuring apparatuses are furthermore provided in order to sense the volumes of delivered adhesive and delivered diluent, wherein an adjusting means is provided in order to adjust the volume of gaseous foaming medium to be delivered, and wherein the control and regulation device regulates, by means of the sensed delivered volumes of adhesive and of diluent, the volume of gaseous foaming medium to be delivered. These measuring apparatuses and adjusting means as well are preferably configured as flow meters or as valves that permit a continuous transition between switching positions. More detailed information regarding such flow meters and valves is provided above, and applies correspondingly to this intended use. The same is also true for possible utilization for the gaseous foaming medium or further additives and/or additional agents.

A further advantage is the use of a gaseous foaming medium in the form of a gas mixture that contains at least in part air, nitrogen, oxygen, carbon dioxide, or carbon or the mixture of one or more of said gases.

A further advantage is the use of a gaseous foaming medium that contains a gas mixture that contains at least 5 vol % oxygen based on the total volume of the gas mixture.

Alternatively thereto, an inert gas such as nitrogen, and a noble gas such as helium, argon, krypton, xenon, or radon, can also be utilized as a gaseous foaming medium.

In an advantageous embodiment, the gaseous foaming medium is adjusted, before delivery, to a temperature in the range from 5° C. to 45° C.

In an advantageous embodiment, the diluent is adjusted, before delivery, to a temperature in the range from 10° C. to 45° C.

Particularly preferably, the temperatures of the diluent and gaseous foaming medium are adjusted in such a way that the temperature difference between the gaseous foaming medium and the diluent is in a range from 10° C. to 30° C.

A further advantage is delivery of the gaseous foaming medium into the foaming chamber under a pressure greater than 2 bar. The pressure of the foaming medium is preferably in a range from 2 bar to 10 bar.

A further advantage is the use of a buffer reservoir as a foam storage container, from which the adhesive foam can be discharged onto a substrate. It has proven advantageous here to deliver the foaming medium and/or the diluent to the foaming chamber under a pressure that is higher than the pressure existing in the buffer reservoir. The foaming medium and/or the diluent are preferably delivered to the foaming chamber at a pressure more than 0.5 bar above the pressure existing in the buffer reservoir.

In an advantageous refinement, the diluent at least in part comprises water. Such diluents can, for example, be particularly inexpensive. In a preferred refinement, the diluent can comprise exclusively water.

It has proven to be advantageous to use an adhesive that is soluble in the diluent. This is to be understood, for example in the context of the use of water as a diluent or of a water-based diluent, to mean a water-soluble adhesive. "Soluble" is to be understood in this invention to mean that the adhesive or at least one adhesive component is soluble or dispersible or emulsifiable by the diluent. This can occur in particular as coarse-particle dispersion or also as colloidal solution. Dissolution can be carried out, for example, generally in an aqueous phase, preferably in alkaline solutions. The operation can also be assisted by temperatures of up to 45° C., and preferably occurs at between approx. 20° C. and 30° C.

In an advantageous refinement of the invention, a thermoplastic adhesive that is heated, before delivery, to a temperature in the range from 100° C. to 220° C. is used.

Suitable compositions of usable adhesives are described in particular in EP 1 904 596 or EP 2 188 451, the disclosures of which in this regard supplement the disclosure here.

For example, in a refinement it has proven to be advantageous to use as an adhesive a hot melt adhesive that is based in particular on a selection of hot melt adhesive base polymers, tackifying resins, plasticizers and/or waxes, additives, and/or scent.

The thermoplastic hot melt adhesives utilized can preferably have a high softening temperature (ring and ball method, measured per DIN 52011). These are preferably nonreactive solvent-free adhesives, solid at room temperature, that melt at elevated temperatures, are applied hot, and produce a solid bond upon cooling. Hot melt adhesives of this kind can contain one or more thermoplastic base polymers as well as resins, plasticizers, and optionally other additives and additional agents. The known thermoplastic base polymers such as polyolefins, ethylene vinyl acetate copolymers, polyamides, polyesters, polyurethanes, polyacrylates, or styrene copolymers or styrene block copolymers can be used in a hot melt adhesive that is suitable according to the present invention. Such polymers are known in principle to one skilled in the art. The softening temperature can be influenced by way of the monomers and molecular weight that are selected.

Examples of suitable base polymers are homo- or copolymers based on ethylene and/or propylene and obtainable by radical or coordinative polymerization, as well as optionally further copolymerizable monomers. The monomers that can be used in addition to ethylene and/or propylene are the known olefinically unsaturated monomers that are copolymerizable with ethylene or propylene. These are, in particular, linear or branched C4 to C20 α-olefins such as butene, hexene, methylpentene, octene; cyclically unsaturated compounds such as norbornene or norbornadiene; symmetrically or asymmetrically substituted ethylene derivatives, wherein C2 to C12 alkyl residues are suitable as substituents. They can be homopolymers or copolymers, which can also contain further monomers. "Homo- or copolymers" are also to be understood as polymers of more than two monomers. The quantity of the comonomers should preferably be below 30 wt %. An embodiment of the invention uses copolymers based on ethylene with C4 to C20 α-olefins. Another embodiment uses polymers of propylene with C4 to C20 α-olefins. Copolymers based on ethylene and/or propylene are also suitable. These can also be manufactured by catalysis using metallocene compounds. Such binding agents are often amorphous atactic polyolefins (APAO).

The (co)polymers thus obtained have a molecular weight from 1000 to 200,000 g/mol, in particular from 1500 to 50,000 g/mol, particularly preferably up to 30,000 g/mol (number-average molecular weight MN, identifiable by gel permeation chromatography). Those polymers which have a low viscosity at 150 to 180° C. are particularly suitable. Such polyolefins are known to one skilled in the art and can be obtained commercially from a variety of manufacturers.

Ethylene-vinyl acetate (EVA) copolymers are also suitable. These are copolymers based on vinyl acetate and ethylene, which optionally can also contain further monomers polymerized in. They are generally intended to be crystalline or partly crystalline, and to have a softening point above 90° C. The vinyl acetate content is to be between 10 and 50 wt %, preferably between 15 and 40 wt %, in particular 18 to approximately 30 wt %.

Further monomers incorporated by polymerization can additionally be contained, for example C3 to C10 unsaturated carboxylic acids such as acrylic acid, methacrylic acid, crotonic acid, isocrotonic acid; α-β-unsaturated C4 to C10 alkylenedicarboxylic acids such as maleic acid, fumaric acid, or itaconic acid. Further monomers that can be polymerized into the EVA are, for example, C1 to C15 alkyl vinyl esters, C1 to C15 alkyl (meth)acrylate, C1 to C15 alkyl esters of dicarboxylic acids, for example alkyl fumarate, methyl (meth)acrylate, butyl (meth)acrylate, 2-ethylhexyl (meth)acrylate; C1 to C6 hydroxyalkyl (meth)acrylate such as hydroxyethyl or hydroxypropyl (meth)acrylate; acrylonitrile, acrylamide, methacrylamide, N-methylolacrylamide. Such monomers can be contained in the EVA copolymers in quantities from 0.2 to 10 wt %, in particular up to 5 wt %, based on the polymer. Important functional parameters such as glass transition temperature (TG), melting point, or softening point can be influenced by the choice of monomers. The molecular weight (MN) of such EVA copolymers is usually between 3000 and 200,000 g/mol, in particular up to 100,000 g/mol.

One skilled in the art is familiar with the selection of EVA polymers, methods for manufacturing them, and suitable co-monomers. He or she can select them based on applications-engineering properties, for example melting temperature, melt viscosity, softening point, or adhesion properties.

Elastic thermoplastic polymers can, for example, also be used. Such elastic polymers are to be understood in particular as styrene block copolymers that can comprise elastic or rubber-elastic properties. They can be two-block or three-block copolymers that can comprise at least one styrene block. Examples thereof are SBR, SAN, styrene-isoprene copolymers (SIS), styrene-ethylene/butylene copolymers (SEBS), styrene-ethylene/propylene copolymers (SEPS), styrene-isoprene-butylene copolymers (SIBS), styrene-butadiene copolymers (SBS), hydrogenated styrene-butylene-butadiene copolymers (SBBS). Block copolymers of this kind are known to one skilled in the art and are commercially obtainable. The properties of the block copolymer can be influenced by way of the length of the styrene blocks. Such polymers can also be used in particular as mixtures. These products are known to one skilled in the art and are commercially obtainable.

Also suitable as a hot melt adhesive are, for example, thermoplastic polyesters such as those obtainable by reacting dicarboxylic acids with corresponding polyfunctional alcohols, in particular difunctional alcohols, for example difunctional polyethers such as polyethylene oxide. Polyesters of this kind are described, for example, in EP-A 028687. These are reaction products of aliphatic, cycloaliphatic, or aromatic dicarboxylic acids that can be reacted with aliphatic, cyclic, or aromatic polyols. Crystalline or partly crystalline polyesters can be obtained depending on the carboxylic acids and polyols selected. Usually dicarboxylic acids and diols are caused to react with one another. It is also possible, however, for small portions of tricarboxylic acids or triols to be used. The resulting polyesters are not crosslinked and are meltable. Linear polyesters are preferred. The molecular weight of suitable polyesters is to be between 1500 and 30,000 g/mol, in particular between 3000 and 20,000 g/mol.

Further suitable hot melt adhesives can be, for example, thermoplastic polyamides. Suitable polyamides are described, for example, in EP-A 749 463. These are polyamide hot melt adhesives based on dicarboxylic acids and polyether diamines. Hot melt adhesives that are also suitable are described in EP-A 204 315. These are polyester amides that are manufactured on the basis of polymer fatty acids and polyamines. It is also possible to use block copolymers of polyamides and polyethers which are obtained by reacting polyamides of substantially linear structure, terminated with carboxylic acid functions and/or amine groups and based on dimerized fatty acids, as well as aliphatic or cycloaliphatic diamines, with substantially linear aliphatic polyethers and/or amines thereof.

Dimer or polymer fatty acids are those fatty acids which, in known fashion, are manufactured by dimerization of unsaturated long-chain fatty acids recovered from natural raw materials, optionally also hydrogenated, and then repurified by distillation. In addition to dimer or polymer fatty acids, the acid component of the polyamide can also contain C4 to C14 dicarboxylic acids. Examples of such dicarboxylic acids are maleic acid, succinic acid, adipic acid, azelaic acid, sebacic acid, dodecanedioic acid, glutaric acid, suberic acid, pimelic acid, or also aromatic dicarboxylic acids such as terephthalic acid, or mixtures.

The diamine component is made substantially of one or more aliphatic diamines, preferably having an even number of carbon atoms, the amino groups being at the ends of the carbon chains. The aliphatic diamines can contain 2 to 30 carbon atoms, and the aliphatic chain can be linear or slightly branched. The amino component can furthermore contain cyclic diamines or heterocyclic diamines, for example 1,4-cyclohexanediamine, 4,4'-diaminodicyclohexylmethane, piperazine, cyclohexane-bis(methylamine), isophorone diamine, dimethylpiperazine, dipiperidylpropane, dimer diamines (amines produced from dimer fatty acids). Nylon grades can also be used, for example, as a hot melt adhesive, for example nylon-6,6, nylon-6,9, or nylon-6,12.

The hot melt adhesive suitable according to the present invention must contain at least one base polymer; it is also possible to use mixtures of polymers. Because the polymers substantially influence the properties of the hot melt adhesive, the softening point of the base polymers is to be from 70 to 200° C., in particular above 80° C. and below 160° C. The hot melt adhesive can additionally contain further constituents.

The hot melt adhesive contains at least one resin. The resin produces additional tackiness and improves the compatibility of the hot melt adhesive components. These resins are, in particular, those which possess a softening point from 70 to 150° C. (ring and ball method, DIN 52011). These are, for example, aromatic, aliphatic, or cycloaliphatic hydrocarbon resins, as well as modified or hydrogenated versions thereof. Examples thereof are aliphatic or alicyclic petroleum hydrocarbon resins and hydrogenated derivatives. Further resins usable in the context of the invention are hydroabietyl alcohol and esters thereof, in particular esters thereof with aromatic carboxylic acids such as terephthalic acid and phthalic acid; preferably modified natural resins such as resin acids from balsam resin, tall resin, or wood rosin, for example fully saponified balsam resin, or alkyl esters of (optionally) partially hydrogenated rosin having low softening points, such as methyl, diethylene glycol, glycerol, and pentaerythritol esters; terpene resins, in particular copolymers of terpene, such as styrene/terpene, α-methyl styrene/terpene, phenol-modified terpene resins, and hydrogenated derivatives thereof; acrylic acid copolymerizates, preferably styrene-acrylic acid copolymers, and reaction products based on functional hydrocarbon resins. It is preferred to use partially polymerized tall resin, hydrogenated hydrocarbon resins, or rosin and derivatives thereof, individually or mixed.

The resin has a low molecular weight of less than 2000 g/mol, in particular less than 1500 g/mol. It can be chemically inert or it can optionally also contain functional groups, for example OH groups, carboxyl groups, or double bonds. The quantity of resin is to be between 0 and 40 wt % based on the hot melt adhesive, in particular 5 to 30 wt %.

Additives or additional agents that can influence specific properties of the adhesive, such as cohesive strength, viscosity, softening point, or processing viscosity, are contained as further constituents in the hot melt adhesive according to the present invention. These are to be understood as, for example, plasticizers, stabilizers, waxes, adhesion promoters, antioxidants, or similar additives. The quantity is to be up to 30% by weight. Multiple additives can also be used as a mixture. Fillers can additionally be used in order to enhance strength.

Plasticizers are utilized preferably in order to adjust the viscosity or flexibility, and are contained generally at a concentration from 0 to 20% wt %, preferably from 0 to 10 wt %. Suitable plasticizers are, for example, medicinal white mineral oils, naphthenic mineral oils, polypropylene oligomers, polybutene oligomers, and polyisoprene oligomers, hydrogenated polyisoprene oligomers and/or polybutadiene oligomers, benzoate esters, phthalates, adipates, vegetable or animal oils, and derivatives thereof. Hydrogenated plasticizers are selected, for example, from the group of paraffinic hydrocarbon oils.

Polypropylene glycol and polybutylene glycol, as well as polymethylene glycol, are also suitable.

Waxes can optionally be added to the melt adhesive in quantities from 0 to 30% wt %. The quantity is adjusted in this context so that on the one hand the viscosity is lowered to the desired range, but on the other hand adhesion is not negatively influenced. The wax can be of natural or synthetic origin. Natural waxes that can be used are vegetable waxes, animal waxes, mineral waxes, or petrochemical waxes. Chemically modified waxes that can be used are hard waxes such as montan ester waxes, sarsol waxes, etc. Polyalkylene waxes and polyethylene glycol waxes are utilized as synthetic waxes. Petrochemical waxes such as petrolatum, microwaxes, and synthetic waxes are preferably used, in particular polyethylene waxes, polypropylene waxes, optionally PE or PP copolymers, Fischer-Tropsch resins, paraffin waxes, or microcrystalline waxes.

Stabilizers or light protection agents are a further group of additives. Their purpose is to protect the polymers from breakdown during processing. The antioxidants may be mentioned here in particular. They are added to the hot melt adhesive usually in quantities of up to 3 wt %, preferably in quantities from approximately 0.1 to 1.0 wt %.

Fillers can also optionally be added to the adhesive in quantities of up to 25 wt %, for example finely ground inorganic compounds such as chalk, coated chalk, lime powder, calcium magnesium carbonates, aluminum oxides and hydroxides, precipitated silicic acid, zeolites, bentonites, glass, hollow spheres, or ground minerals. These are intended to be present as powders, i.e. to have a particle size of between 1 and 200 µm, in particular between 3 and 50 µm. They are homogeneously dispersed in the adhesive. The strength of the adhesive, and its viscosity behavior, can be influenced by way of the selection and quantity.

Additives of this kind are known in principle to one skilled in the art, who can make a selection based on the desired properties of the hot melt adhesive.

Alternatively, it can also prove useful to use an adhesive in the form of an aqueous dispersion that contains at least 50 wt % (based on the solids of the dispersion) polyvinyl acetate copolymers (PVAc). These dispersions can furthermore contain up to 50 wt % adjuvants, for example surfactants, stabilizers, pigments, fillers, thickening agents, defoaming agents, and other inert polymers.

Polymer dispersions of this kind are known in principle to one skilled in the art. They are, in particular, copolymers based on monomers reacted by radical emulsion or suspension polymerization. The term "dispersion" is intended, in this invention, also to comprise emulsions, suspensions, or aqueous solutions.

The monomers contained are intended to be predominantly vinyl esters; portions of polymerizable monomers that carry functional groups convertible into anionic groups, for example carboxyl groups, portions of nonpolar copolymerizable monomers such as aromatic monomers or unsaturated carboxylic acid esters, portions of monomers carrying polar groups, and optionally small portions of polymerizable compounds having more than one double bond, can also additionally be contained.

A variety of copolymerizable monomers can be contained, but it is preferred not to use any halogenated monomers or monomers that comprise mutually reacting functional groups that can later crosslink with one another upon storage or application.

A suitable copolymer is constructed from a variety of copolymerizable monomers. Esters of vinyl alcohol and C2 to C6 monocarboxylic acids are contained as a principal constituent, for example vinyl acetate or vinyl hexanoate, in particular vinyl acetate, vinyl propionate, and/or vinyl n-butyrate.

Copolymerizable monomers that contain acid groups as a further functional group can also optionally be contained. This can refer to inorganic acid groups such as sulfonic acid groups, phosphoric acid groups, or phosphonic acid groups, or preferably to carboxylic acid groups. Examples thereof are vinylphenylsulfonic acid, vinylsulfonic acid, vinylphosphoric acid, or vinylphenylphosphonic acid. $\alpha,\beta$-unsaturated C3 to C9 mono- or dicarboxylic acids are in particular intended to be contained, in particular C3 to C5. These are particularly preferably acrylic acid, methacrylic acid, itaconic acid, crotonic acid and/or maleic acid, fumaric acid, or semi-esters thereof with C1 to C4 alcohols. The corresponding carboxylic acid anhydrides can also be used.

Copolymers suitable according to the present invention can furthermore additionally contain nonpolar monomers, i.e. they are intended to comprise no polar groups. Examples thereof are esters of $\alpha,\beta$-ethylenically unsaturated C2 to C5 mono- or dicarboxylic acids with C1 to C12 linear or branched alkanols, for example methyl, ethyl, n-butyl, isobutyl, and 2-ethylhexyl esters of acrylic acid and of methacrylic acid, methyl, ethyl, propyl esters of crotonic acid, dimethyl or di-n-butyl esters of maleic acid and fumaric acid. Further nonpolar monomers that can be contained are vinyl esters of long-chain linear or branched monocarboxylic acids. Examples thereof are vinyl esters of C7 to C18 monocarboxylic acids, such as stearic acid, lauric acid, or versatic acids.

The possibility that the polymers can be weakly crosslinked with one another via branching modules, or can posses a branched structure, is also not excluded. This can be achieved by way of small portions of multiply functional monomers. These can be di- or polyfunctional monomers. These polyfunctional monomers result in branching or crosslinking within the polymer particles. The swelling behavior or viscosity of the dispersion can also be influenced in this manner. The molecular weight of the copolymers is high, usually above 250,000 g/mol (measurable by GPC against a polystyrene standard).

Anionic or nonionic substances can be used as a protective colloid for manufacturing the polymer dispersion. Examples thereof are natural polymers such as starch ethers and/or cellulose ethers or derivatives thereof, e.g. modified by oxidation, esterification, etherification, acidic breakdown, in particular hydroxyalkyl ether starches, hydroxyalkyl celluloses, carboxyalkyl celluloses, carboxyalkyl ether starches; dextrins or hydroxyalkyl dextrins. These can be used individually or as a mixture.

The protective colloids are to be anionic or neutral, optionally even after neutralization. Such products are commercially obtainable and can be selected by one skilled in the art based on their properties.

The suitable polymer dispersions are manufactured, using methods known per se, in aqueous solution by radical polymerization in the presence of protective colloids or surfactants. Methods for manufacturing the copolymers are known to one skilled in the art. Such dispersions are furthermore commercially obtainable in various compositions having different molecular weights.

The solids concentration in the polymer dispersion can be adjusted during manufacture within a wide range, and is equal to, for example, 25 to 75 wt %, in particular 45 to 65 wt %. These dispersions are preferably to be free of organic solvents, i.e. only small quantities below 0.5% are to be present.

Preferred embodiments of the invention are shown with the attached Figures, in which.

Figure 1:
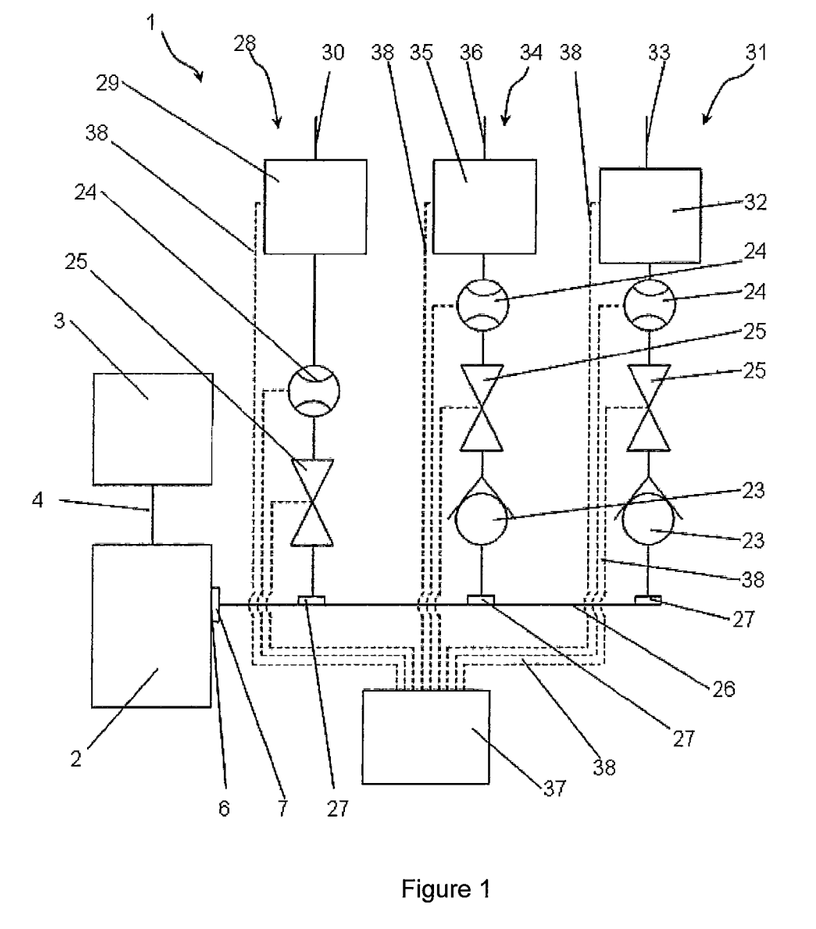
FIG. 1 is a schematic functional view of a foaming apparatus according to the present invention.

FIG. 1 is a schematic functional view of a foaming apparatus 1 according to the present invention comprising a foaming unit 2 for foaming an adhesive by means of a gaseous foaming medium. The adhesive used in the present exemplifying embodiment is an aqueous dispersion that contains at least 50 percent by weight polyvinyl acetate copolymers (PVAC) (based on the solids in the dispersion). The dispersion also contains further adjuvants, for example surfactants, stabilizers, pigments, fillers, and/or thickening agents. The gaseous foaming agent used in the present exemplifying embodiment is compressed air, i.e. a gas mixture, wherein of the total volume of the gas mixtures, at least 5 percent by volume oxygen is contained in said gas mixture. It is possible here for the compressed air to be made of usual air, containing substantially nitrogen and oxygen, which is compressed; in particular, argon, carbon dioxide, hydrogen, and traces of other gases can be contained. The foaming unit comprises mechanical foaming means (not depicted) with which said adhesive can be foamed by means of the gaseous foaming medium to yield an adhesive foam. Said adhesive foam travels through a discharge opening 5 via a connecting conduit 4 into a buffer reservoir 3, from which the adhesive foam can be discharged onto a substrate. In order to allow the characteristics and properties of the adhesive foam to be influenced, in the context of foaming apparatus 1 according to the present invention provision is additionally made to deliver a third component into foaming unit 2, the third component being a flowable diluent in order to dilute the adhesive and/or the adhesive foam. In the exemplifying embodiment shown, the flowable diluent is water. It can optionally also be an additive that influences the properties of the adhesive and/or of the adhesive foam.

The three components are provided via corresponding delivery units 28, 31, 34. A first delivery unit 28 is furnished for providing the adhesive. First delivery unit 28 comprises an adhesive reservoir 35 that respectively comprises a buffer reservoir or an adhesive reservoir 29 and can also be equipped with an adhesive connector 30 for filling in particular by means of a compressed-air-operated pump. Attached to adhesive reservoir 29 is a conduit that comprises a flow meter 24 as well as a control valve 25 for controlling or regulating the adhesive supply via a flange 27 that is attached as a delivery means to a delivery conduit 26, said delivery conduit 26 terminating via a further flange 27 in a loading opening 6 of foaming unit 2. Second delivery unit 31 serves to provide the gaseous foaming medium, and comprises a compressed air reservoir 32 as well as an external compressed air connector 33. Alternatively, only an external compressed air connector 33 can be provided, and the compressed air reservoir 32 embodied as a buffer reservoir can be omitted. Also provided is a conduit system that comprises in particular a flow meter 24 as well as a control valve 25 for controlling or regulating the supply of compressed air. A check valve 23 prevents contamination of the components of second delivery unit 31. The latter is connected via a flange 27 to the above-described delivery conduit 26 and, like first delivery unit 28, terminates via delivery conduit 26 via said loading opening 6 in foaming unit 2. A similar configuration is also contained by third delivery unit 34, comprising a water reservoir 35 as well as an external water connector 36, the use of a water reservoir 35 here as well being dispensable. Also provided in particular are a flow meter 24, control valve 25, and a check valve 23. Like the other two delivery units 28, 31, third delivery unit 34 is also connected via a flange 27 to said delivery conduit 26, and terminates via the latter via loading opening 6 in foaming unit 2.

Valves 25 described above provide adjusting means in order to adjust the ratio of the individual components with respect to one another in order to influence the properties of the adhesive foam. Flow meters 24 serve to sense the respective volumes, provided via delivery units 28, 31, 34, of adhesive, of gaseous foaming medium, and of flowable diluent. A control unit 37, which is connected via leads 38 to a plurality of the components of delivery units 28, 31, 34, is provided in order to sense data and for control and regulation. It is particularly suitable, for example, to equip adhesive reservoir 29, compressed air reservoir 32, and/or water reservoir 35 with suitable sensors, for example fill level sensors, temperature sensors, pressure sensors, etc. the latter being connected via corresponding leads 38 to control unit 37 so that the components to be provided can be monitored. Flow meters 24 and valves 25 are furthermore connected to the control unit. Provision is made in particular for an operating mode of foaming apparatus 1, and especially of control unit 37, such that in order to discharge an adhesive foam, valve 25 of first delivery unit 28 is opened by control unit 37. The volume of adhesive emerging is sensed by flow meter 24, on the basis of which control unit 37 applies control to valve 25 of second delivery unit 31; regulation of the volume of gaseous foaming agent required for foaming can be ensured by means of flow meter 24 of second delivery unit 31. Control and regulation of third delivery unit 34 by means of control unit 37 is similarly possible in order to adjust the degree of dilution and the characteristic of the adhesive foam to be discharged.

Figure 2:
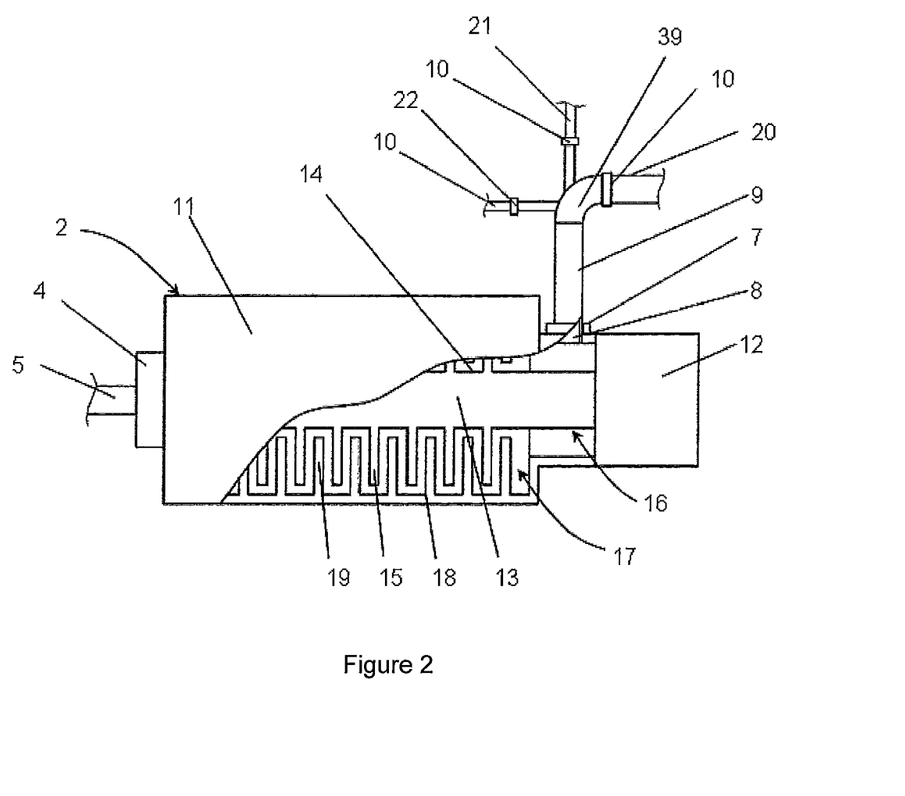
FIG. 2 is a partly sectioned side view of a foaming unit of the foaming apparatus of FIG. 1.

FIG. 2 shows a foaming unit 2 of a foaming apparatus 1 according to the present invention. Foaming unit 2 contains a cylindrical housing 11 that encloses a foaming chamber 17. Radially inwardly protruding stator ribs 19 are provided on inner housing wall 18. Foaming unit 2 has, at the one end face, discharge opening 5 having a connecting conduit 4 attached thereto. Provided at the opposite end face is a motor 12 (not shown in detail) that is provided in order to drive a shaft 13 projecting into foaming chamber 17. The shaft has radially outwardly protruding rotor ribs 15 on its shaft enveloping surface 14. Said stator ribs 19 and rotor ribs 15 are configured and mutually situated in such a way that rows of rotor ribs 15 extending circumferentially over shaft enveloping surface 14 are arranged between rows of stator ribs 19 extending circumferentially over housing inner wall 18. These rotor ribs 15, together with stator ribs 19, constitute the mechanical foaming means and serve to foam the adhesive delivered into foaming chamber 17 using the delivered gaseous foaming medium and optionally the flowable diluent.

Provided on the drive side, comprising motor 12, of foaming unit 2 is a chamber pre-cavity 16, adjacent to foaming chamber 17, that comprises in its outer wall loading opening 6 for delivery of the three components. A delivery member 9 is connected via flange 7 to foaming unit 2, and terminates in loading opening 6. Delivery member 9 can be part of the above-described delivery conduit 8 or also can be delivery conduit 8 itself. In the exemplifying embodiment shown, delivery member 9 comprises a distributor segment 39 at which an adhesive delivery system 20, a water delivery system 21, and a compressed air delivery system 22 are connected via respective flanges 10 to delivery member 9, and terminate via the latter in loading opening 6. Distributor segment 39 is configured in such a way that each of the delivered components is delivered at a 30° angle in terms of the main flow direction of delivery member 9, i.e. in terms of the direction in which all the components terminate via loading opening 6 in chamber pre-cavity 60, or in terms of a respective further component. The components can in this fashion already be mixed with one another before reaching foaming chamber 17. In the exemplifying embodiment shown, a distributor segment 39 of cruciform shape is used, the vertical line of the cross being produced by two oppositely located component delivery systems, for example compressed air delivery system 22 and adhesive delivery system 20. This makes possible particularly good intermixing of adhesive and compressed air even before reaching chamber pre-cavity 16 and foaming chamber 17. The horizontal line is provided on the side facing toward the foaming unit by the delivery system of delivery member 9 connected to flange 7, and on the oppositely located side by a component delivery system, for example by water delivery system 21. Other suitable foaming apparatuses are of course also usable for foaming apparatus 1 according to the present invention.

LIST OF REFERENCE CHARACTERS

1 Foaming apparatus
2 Foaming unit
3 Buffer memory
4 Connecting conduit

5 Discharge opening
6 Loading opening
7 Housing flange
8 Delivery conduit
9 Delivery member
10 Delivery flange
11 Housing
12 Motor
13 Shaft
14 Shaft enveloping surface
15 Rotor rib
16 Chamber pre-cavity
17 Foaming chamber
18 Inner housing wall
19 Stator rib
20 Adhesive delivery system
21 Water delivery system
22 Compressed air delivery system
23 Check valve
24 Flow meter
25 Control valve
26 Delivery conduit
27 Flange
28 First delivery unit
29 Adhesive reservoir
30 Adhesive connector
31 Second delivery unit
32 Compressed air reservoir
33 Compressed air connector
34 Third delivery unit
35 Water reservoir
36 Water connector
37 Control unit
38 Lead
39 Distributor segment

The invention claimed is:

1. A foaming apparatus (1) comprising a foaming unit (2) having a foaming chamber (17) having mechanical foaming means (15, 19) contained therein, with which means at least three components delivered to the foaming chambers (17) are mixable, wherein at least an adhesive, a gaseous foaming medium, and a flowable diluent are utilized as components in order to output an adhesive foam, wherein adjusting means (25) are provided for adjusting the ratio of the individual components with respect to one another in order to influence the properties of the adhesive foam.

2. The foaming apparatus (1) according to claim 1, characterized in that the foaming chamber (17) comprises one or more loading openings (6); and a first delivery unit (28) for the adhesive and a second delivery unit (31) for the gaseous foaming medium and a third delivery unit (34) for the flowable diluent are provided, wherein each of the delivery units (28, 31, 34) delivers the respective component to the foaming chamber (17) via the at least one loading opening (6).

3. The foaming apparatus (1) according to claim 2, characterized in that all components of all delivery units (28, 31, 34) are delivered to the foaming chamber (17) via the same loading opening (6).

4. The foaming apparatus (1) according to claim 3, characterized in that a delivery conduit (26) terminates in the loading opening (6), wherein each delivery unit (28, 31, 34) is connected to the delivery conduit (26) and terminates via the delivery conduit (26) in the foaming chamber (17).

5. The foaming apparatus (1) according to claim 4, characterized in that the second and/or the third delivery unit (31, 34) is connected via a check valve (23) to the delivery conduit (26).

6. The foaming apparatus (1) according to claim 4, characterized in that the delivery conduit (26) comprises a check valve (23) between two adjacent terminating openings of two delivery units (28, 31, 34).

7. The foaming apparatus (1) according to claim 1, characterized in that a measuring apparatus (24) for sensing the volume of the delivered adhesive is provided; and an adjusting means (25) is provided in order to adjust the volume of the diluent to be delivered, wherein a control unit (37) regulates via the adjusting means (25), by means of the delivered volume of adhesive which is sensed, the volume of diluent to be delivered.

8. The foaming apparatus (1) according to claim 7, characterized in that a measuring apparatus (24) for sensing the volumes of the delivered adhesive and of the delivered diluent is provided; and an adjusting means (25) is provided in order to adjust the volume of the gaseous foaming medium to be delivered, wherein a control unit (37) regulates via the adjusting means (25), by means of the delivered volumes of adhesive and of diluent which are sensed, the volume of the gaseous foaming medium to be delivered.

9. The foaming apparatus (1) according to claim 8, characterized in that the adjusting means (25) comprises a controllable valve (25) as well as a measuring apparatus (24) for sensing the delivered volume of diluent and/or of gaseous foaming medium.

10. The foaming apparatus (1) according to claim 9, characterized in that the gaseous foaming medium is a gas mixture that contains at least in part air, nitrogen, oxygen, carbon dioxide, or carbon or the mixture of one or more of said gases.

11. The foaming apparatus (1) according to claim 10, characterized in that the gaseous foaming medium is a gas mixture that contains at least 5 vol % oxygen based on the total volume of the gas mixture.

12. The foaming apparatus (1) according to claim 11, characterized in that the gaseous foaming medium is adjusted, before delivery, to a temperature in the range from 5° C. to 45° C.

13. The foaming apparatus (1) according to claim 12, characterized in that the diluent is adjusted, before delivery, to a temperature in the range from 10° C. to 45° C.

14. The foaming apparatus (1) according to claim 1, characterized in that a buffer reservoir (3) is provided as a foam storage container, wherein the gaseous foaming medium and/or the diluent are delivered to the foaming chamber (17) under a pressure that is higher than the pressure existing in the buffer reservoir (3).

15. The foaming apparatus (1) according to claim 14, characterized in that the foaming medium and/or the diluent are delivered to the foaming chamber (17) at a pressure more than 0.5 bar above the pressure existing in the buffer reservoir (3).

16. An apparatus for foaming adhesive (1) a foaming unit (2) having a mixing and foaming chamber (17), said chamber comprising a mechanical foaming means (15, 19) therein, and at least three component delivery units to supply the components to the foaming chambers (17), wherein the first component is an adhesive, second component is a gaseous foaming medium, and a third component is a diluent; and wherein each of the delivery units comprise an independent controller (25) to adjust the ratio of each of the components supplied to the chamber.

17. An apparatus for making foamed adhesive, comprising:
- a foaming unit having a mixing and foaming chamber, said chamber comprising a mechanical foaming means therein;
- a first component delivery unit to supply unfoamed adhesive to the foaming chamber, the first component delivery unit comprising a first controller;
- a second component delivery unit to supply gaseous foaming medium to the foaming chamber, the second component delivery unit comprising a second controller;
- a third component delivery unit to supply diluent to the foaming chamber, the third component delivery unit comprising a third controller;
- wherein each controller can be individually adjusted to control a ratio of unfoamed adhesive and gaseous foaming medium and diluent supplied to the foaming chamber, said foamed adhesive having properties influenced by the ratio of unfoamed adhesive and gaseous foaming medium and diluent.

* * * * *

UNITED STATES PATENT AND TRADEMARK OFFICE
CERTIFICATE OF CORRECTION

PATENT NO. : 9,687,795 B2  
APPLICATION NO. : 14/406423  
DATED : June 27, 2017  
INVENTOR(S) : Jens Erban Page 1 of 1

It is certified that error appears in the above-identified patent and that said Letters Patent is hereby corrected as shown below:

Column 9, Line 46: Change "vinyiphos" to -- vinylphos --.

Signed and Sealed this  
Fifteenth Day of May, 2018

Andrei Iancu  
*Director of the United States Patent and Trademark Office*